(12) United States Patent
Dang

(10) Patent No.: US 6,463,453 B1
(45) Date of Patent: Oct. 8, 2002

(54) LOW POWER PIPELINED MULTIPLY/ACCUMULATOR WITH MODIFIED BOOTH'S RECODER

(75) Inventor: Keith Duy Dang, Pflugerville, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/006,054

(22) Filed: Jan. 12, 1998

(51) Int. Cl.[7] .............................................. G06F 7/52
(52) U.S. Cl. ...................................................... 708/628
(58) Field of Search ................................ 708/628, 629, 708/630, 631, 632

(56) References Cited

U.S. PATENT DOCUMENTS

| | | | | |
|---|---|---|---|---|
| 5,241,492 A | | 8/1993 | Girardeau, Jr. ............. 364/736 |
| 5,333,119 A | * | 7/1994 | Raatz et al. ................. 708/630 |
| 5,574,672 A | * | 11/1996 | Briggs ......................... 708/628 |
| 5,661,673 A | * | 8/1997 | Davis .......................... 708/628 |
| 5,734,601 A | * | 3/1998 | Chu ............................. 708/630 |
| 5,787,029 A | * | 7/1998 | Angel .......................... 708/628 |
| 5,818,743 A | * | 10/1998 | Lee et al. .................... 708/630 |

* cited by examiner

Primary Examiner—David H. Malzahn

(57) ABSTRACT

A low power high speed multiply/accumulator (100) utilizes a modified Booth's recoder (120) to identify situations to power down the partial product array (130). The modified Booth's recoder (120) is responsive to a NOP signal (116) and a add/subtract signal (118) that result from instruction decode. The partial product array (130) can be partially or fully shut-down to conserve power in response to the recoder (120) detecting certain operands and NOP instructions. It also allows implementation a multiply-and-subtract instruction. The output of the partial product array (130) is registered in a high order product register (142) and a low order product register (144). The low order product register (144) accumulates partial products for multiply-and-accumulate and multiply-and-subtract instructions. The carry bit of the low order product register (144) is added (146) to the high order product register (142) to generate the high order result (152), while the low order result (154) are derived from the low order product register (144).

5 Claims, 4 Drawing Sheets

| INPUTS | | | | OUTPUTS | | | |
|---|---|---|---|---|---|---|---|
| $Y_i$ 314 | $Y_{i-1}$ 312 | $Y_{i-2}$ 310 | OPERATION | SEL1A 374 | SEL2A 372 | SEL0 376 | SELANS 378 |
| 0 | 0 | 0 | +0 | 0 | 0 | 1 | 1 |
| 0 | 0 | 1 | +X | 1 | 0 | 0 | 1 |
| 0 | 1 | 0 | +X | 1 | 0 | 0 | 1 |
| 0 | 1 | 1 | +2X | 0 | 1 | 0 | 1 |
| 1 | 0 | 0 | −2X | 0 | 1 | 0 | 0 |
| 1 | 0 | 1 | −X | 1 | 0 | 0 | 0 |
| 1 | 1 | 0 | −X | 1 | 0 | 0 | 0 |
| 1 | 1 | 1 | +0 | 0 | 0 | 1 | 1 |

*FIG.4*

| INPUTS | | | | OUTPUTS | | | |
|---|---|---|---|---|---|---|---|
| $Y_i$ 314 | $Y_{i-1}$ 312 | $Y_{i-2}$ 310 | OPERATION | SEL1A 374 | SEL2A 372 | SEL0 376 | SELANS 378 |
| 0 | 0 | 0 | +0 | 0 | 0 | 1 | 1 |
| 0 | 0 | 1 | +X | 0 | 0 | 1 | 0 |
| 0 | 1 | 0 | +X | 0 | 0 | 1 | 0 |
| 0 | 1 | 1 | +2X | 0 | 0 | 1 | 0 |
| 1 | 0 | 0 | −2X | 0 | 0 | 1 | 0 |
| 1 | 0 | 1 | −X | 0 | 0 | 1 | 0 |
| 1 | 1 | 0 | −X | 0 | 0 | 1 | 0 |
| 1 | 1 | 1 | +0 | 0 | 0 | 1 | 1 |

*FIG.5*

| INPUTS | | | | OUTPUTS | | | |
|---|---|---|---|---|---|---|---|
| $Y_i$ 314 | $Y_{i-1}$ 312 | $Y_{i-2}$ 310 | OPERATION | SEL1A 374 | SEL2A 372 | SEL0 376 | SELANS 378 |
| 0 | 0 | 0 | +0 | 0 | 0 | 1 | 0 |
| 0 | 0 | 1 | +X | 1 | 0 | 0 | 0 |
| 0 | 1 | 0 | +X | 1 | 0 | 0 | 0 |
| 0 | 1 | 1 | +2X | 0 | 1 | 0 | 0 |
| 1 | 0 | 0 | −2X | 0 | 1 | 0 | 1 |
| 1 | 0 | 1 | −X | 1 | 0 | 0 | 1 |
| 1 | 1 | 0 | −X | 1 | 0 | 0 | 1 |
| 1 | 1 | 1 | +0 | 0 | 0 | 1 | 0 |

*FIG.6*

LOW POWER PIPELINED MULTIPLY/ACCUMULATOR WITH MODIFIED BOOTH'S RECODER

FIELD OF THE INVENTION

The present invention generally relates to integrated circuits, and more specifically to a modified Booth's recoder for use in a microcontroller Multiply-Accumulate Unit.

BACKGROUND OF THE INVENTION

Multiply/accumulate units (MACs) are used to perform multiplication of two input operands and the result is added to the accumulator. They are heavily used in many DSP applications and more specifically are used to compute Fast Fourier Transforms.

One current method of implementing multiplication in a MAC unit is the use of a modified Booth's algorithm. It would be helpful to deactivate the multiplier array in a MAC either fully or partially when it is not in use. This is because the multiplier array consumes a significant amount of power and this power could be significantly reduced if the multiplier array were to be either fully or partially deactivated when not in use. One prior art method of reducing power consumption is to gate the clock signal so that data communication between registers is ignored during unanticipated calculation cycles. This technique theoretically operates to reduce the power consumption of a MAC. This approach is reasonably well accepted, but it can be quite complex to design a MAC circuit with proper clock skewing when using this gated clocking scheme.

Another prior art method for designing a low power MAC is to use a comparator to identify when one of the input operands is a binary 0, 1, or −1 value and bypass the known result to the MAC output. This method allows the multiplier array to turn off when any of these special operands (0, +1, −1) is encountered. However, this approach requires an additional logic for the comparator and the power is only reduced when one of the operands must be negative 1, positive 1, or 0.

An improved methodology for implementing a MAC unit using a modified Booth's recoder with some additional gates that can easily and efficiently deactivate the MAC multiplier array when not needed would be advantageous. Such a methodology could significantly reduce the power consumption of an integrated circuit implementing a multiply-accumulate unit (MAC).

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIGS. 4 through 6 are tables illustrating radix-4 Booth's algorithm recoder values generated by the modified Booth's recoder circuit of FIG. 3.

DETAILED DESCRIPTION

A modified Booth's recoder in a multiply/accumulate unit (MAC) is enhanced with a minimum number of additional gates so that the recoder can handle not just a multiply and accumulate instruction, but also other arithmetic functions. This in turn eliminates the additional comparator utilized in the prior art technique discussed above to detect special operands and any worries about using the clock with minimum clock skew. Furthermore, power is significantly reduced at all times using the present invention. In normal pipe lining techniques, there are 2*(m+n) registers that are needed to implement a 2-cycle MAC. This is often not acceptable for high-speed applications which are required for low power consumption and low integrated circuit area. Therefore, minimizing the number of registers needed to pipeline a MAC is a major concern for improving performance as well as circuit area. One additional concern for power consumption is keeping the MAC multiplier array from using power when not in use. This can be done by turning off the array from switching.

Figure 1:
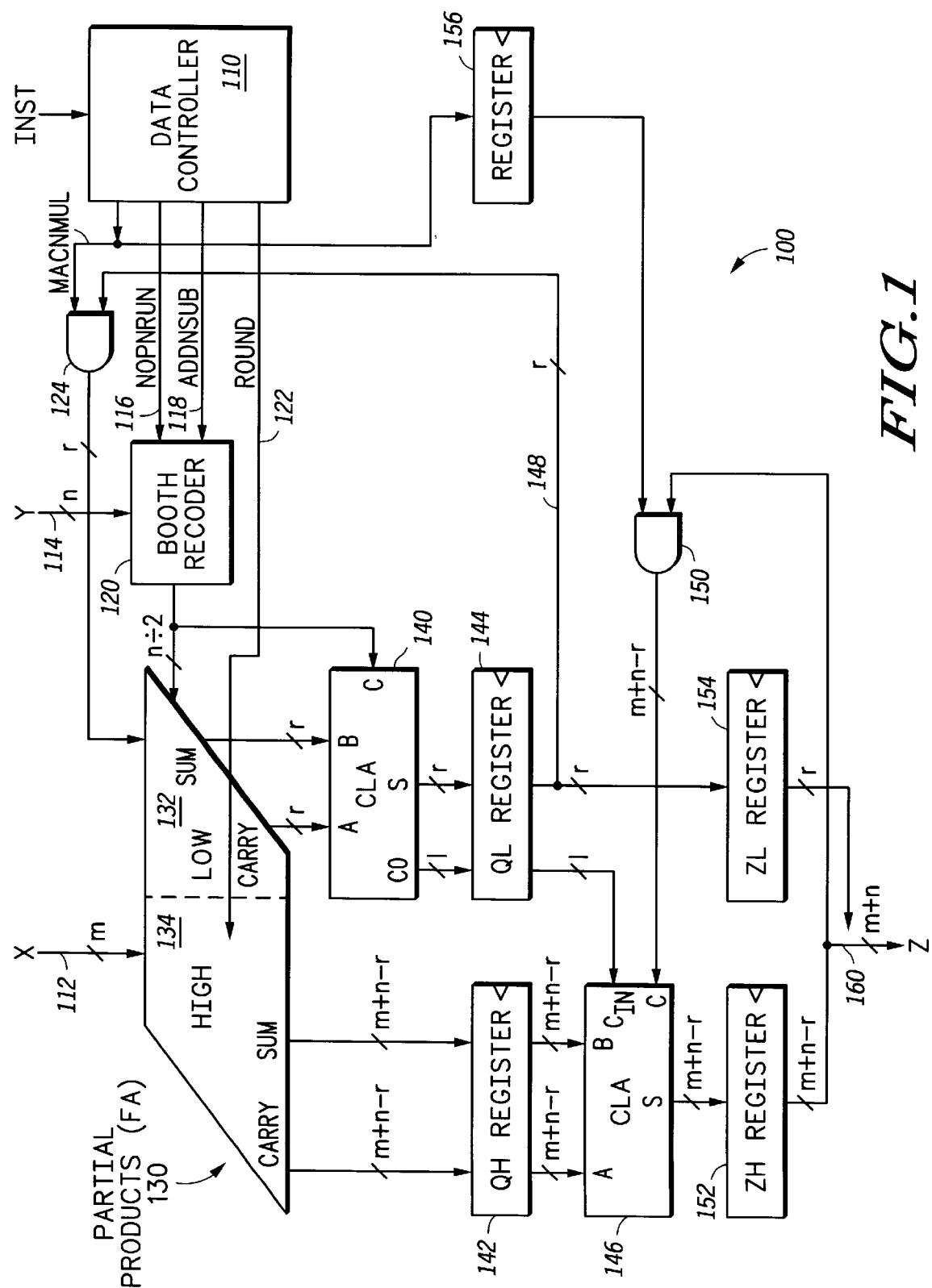
FIG. 1 is a block diagram of a 2-cycle pipe-lined multiply-accumulate (MAC) unit, in accordance with the present invention.

FIG. 1 is a block diagram of a 2-cycle pipe-lined multiply-accumulate (MAC) unit 100. There are two mathematical input operands X 112 and Y 114 to the MAC 100. The X 112 operand is "m" bits, and the Y 114 operand is "n" bits. In the preferred embodiment, "m" equals 20 and "n" equals 18. However, other values of these variables are within the scope of this invention.

Operation of the MAC 100 is controlled by a data controller 110. The data controller 110 is activated and responds to the instruction decode (not shown). The data controller 110 provides two signals: NOP Not Run (NOPNRUN) 116 and Add Not Subtract (ADDNSUB) 118 to a modified Booth's recoder 120. In addition to these two signals that recoder 120 also receives the second (Y) operand 114 as an input. The Booth recoder 120 in turn provides n÷2 recoder 120 signals to the partial product multiplier array 130. The data controller 110 also provides a round signal 122 to the multiplier partial product array 130.

The multiplier partial product array 130 has the first operand containing m-bits (X) 112 as an input. The multiplier partial product array 130 multiplies the Booth's recoded 120 second operand 114 to the first operand 112. The multiplier partial product array 130 has a first low order portion 132 and a second high order portion 134. The output of the low order portion 132 generates two sets of r-bit SUMs and CARRYs. These outputs are added by a first carry look-ahead adder 140 to the accumulator and accumulated in a low order intermediate product register (QL) 144. The high order 134 portion of the multiplier array 130 generates the high order partial product of SUMs and CARRYs (m+n−r) bits. These high order partial products are immediately stored in the high order intermediate product register (QH) 142.

The low order bits of the low order intermediate product register (QL) 144 are accumulated in a low order final register (ZL) 154. The high order intermediate product register (QH) 142 bits are added to the accumulator using a second carry look-ahead adder 146 with the carry-in bit taken from the low order intermediate product register (QL) 144. The output of the second carry look-ahead adder 146 is registered in a high order final result register (ZH) 152. The high order (ZH) 152 and low order (ZL) 154 final result registers together provide the final output (Z) 160 for the multiply accumulate unit 100.

The low order r-bits from the carry look-ahead adder 140 registered in the low order intermediate product register (QL) 144 are one of two sets of inputs to a first AND gate 124. The other input to the first AND gate 124 comes from the data controller 110. The output of the accumulated results of the low order r-bits are fed back into the low order portion 132 of the multiplier array 130. A single delay register 156 receives a single bit input from the data control circuit 110 and provides one of two inputs to a second AND gate 150. The second input to the second AND gate 150 is a result of the high order accumulated final result stored in the high order final result register (ZH) 152. The output of the second AND gate 150 is fed back as the accumulated input to the second carry look-ahead adder 146.

The first pipe-lined registers are inserted between the final partial product outputs and the input of the carry look-ahead adder. The partial product terms can be divided into two sections generally high and low. The lower portion can be multiplied and accumulated in the first cycle so that only a minimum amount of registers are needed for pipe-lining the data. Since the lower portion has the fastest path, r-bits of SUMs and CARRYs are added to the final result in the first stage. The number of r-bits is determined by the speed of the operating clock cycle. On the other hand, the higher order portion of outputs, namely (m*n−1)-bits, is pipe-lined to the second stage for adding to the accumulator. Finally, the result m+n bits are piped to the output registers ZH 152 and ZL 154 on the output bus Z 160.

Data manipulation through the array 132 is controlled by the data control block 110 in addition to the modified Booth's recoder 120. The Booth's recorder 120 is modified so that not only the MAC 100 operation, but also other arithmetic operations can be done in the same circuit as well. Hence, power consumption is reduced, and additional logic is kept to a minimum.

Figure 2:
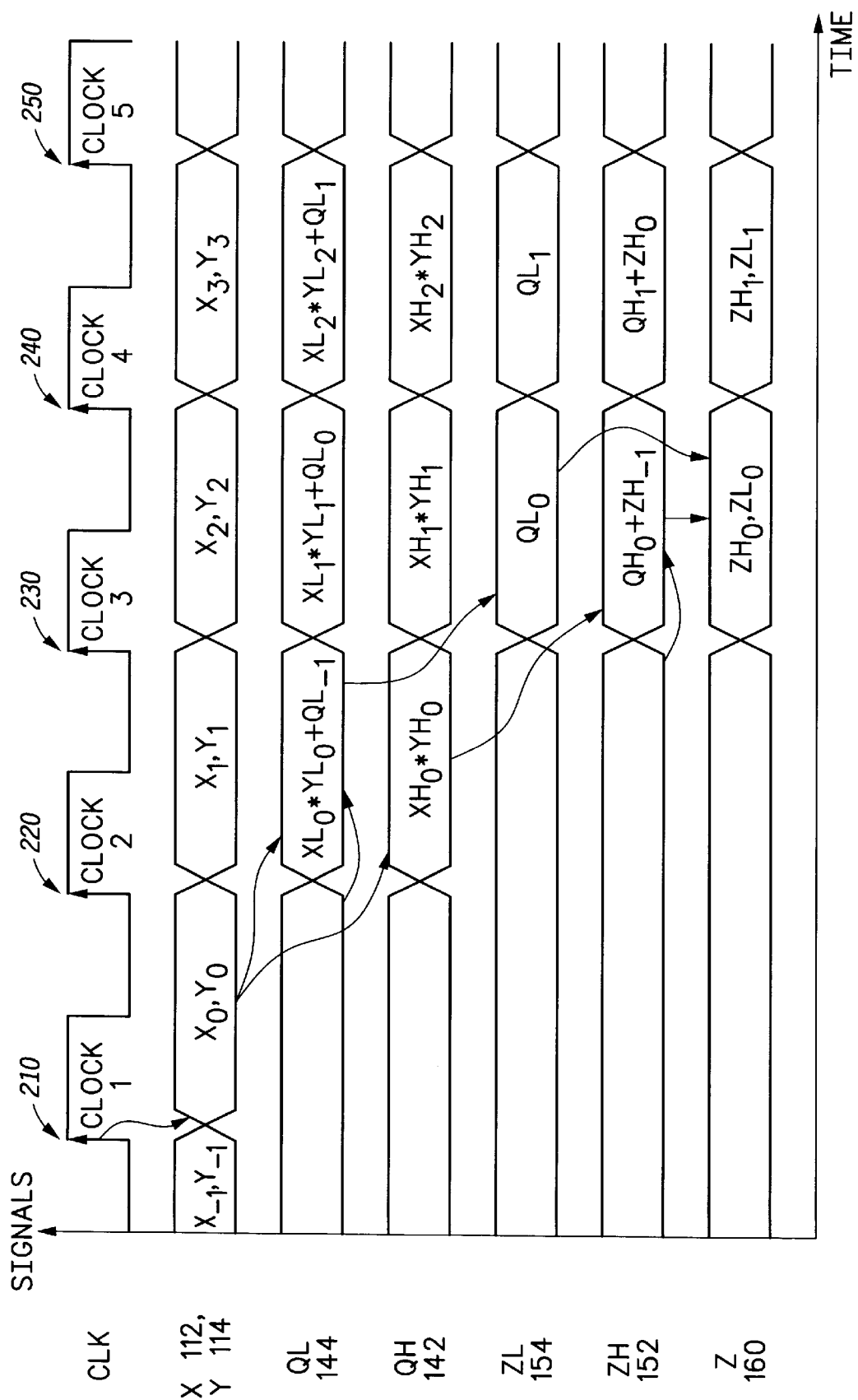
FIG. 2 is a timing diagram of the signals in the reduced power pipe-lined MAC of FIG. 1.

FIG. 2 is a timing diagram of the signals in the reduced power pipe-lined MAC 100. Signals are shown on the vertical axis, and time on the horizonal axis. A clock (CLK) is shown on the top of signals with a reference number of the clock edge for each cycle. The X 112 and Y 114 input operands are registered outside the MAC 100 on the rising edge of the clock. Likewise, the registers 142, 144, 152, 154, and 156 sample their inputs on the rising edge of the clock.

On the second line of the timing diagram, after the clock (CLK) signal, are shown the X 112 and Y 114 operands. A first clock cycle 210 shows an $X_0$ and a $Y_0$ operand. In the second clock cycle 220, a second set of operands: $X_1$, and $Y_1$ are shown. Likewise, for a third clock cycle 230 ($X_2$, $Y_2$) and a fourth clock cycle 240 (X3, Y3). A fifth clock cycle 250 is shown without corresponding operands.

The third line from the top of the timing diagram illustrates the low order intermediate product QL register 144 contents. The QL register 144 receives and accumulates the low order portion of the product of $X_0$ multiplied by $Y_0$ in the second clock cycle 220. This is illustrated by $QL_0 = XL_0*YL_0 + QL_{-1}$. In the third clock period 230, a second product is generated: $QL_1 = XL_1*YL_1 + QL_0$. Likewise in the fourth clock cycle 240, a third product is generated: $QL_2 = XL_2*YL_2 + QL_1$. Note that in each clock cycle, the QL 144 register contents for the previous clock cycle are accumulated for the next clock cycle.

The fourth line from the top of the timing diagram shows the contents of the high order intermediate product (QH) 142 register. In the second clock cycle 220 the high order intermediate product (QH) 142 register contains a high order product: $QH_0 = XH_0*YH_0$. Similarly, in the third clock 230, a second product is registered: $QH_1 = XH_1*YH_1$. Similarly, in a fourth cycle 240, a third high order product is registered by the QH register 142: $QH_2 = XH_2*YH_2$.

Following the QH register 142 contents in the timing diagram is a line containing the contents from the final low order result register ZL 154. In the third clock cycle 230, a low order accumulated product $QL_0$ is registered from the low order intermediate product register (QL) 144 results of the previous clock cycle 220. Similarly, in the fourth clock cycle 240, a low order accumulated product is registered 154 that contain the contents of the QL register 144 from the previous (third) cycle 230: $QL_1$.

The low order result (ZL) register 154 contents is followed in the timing diagram by the high order final result (ZH) register 152 contents. In the third clock cycle 230, the ZH register 152 contains the results from the QH register 142 of the previous (second) cycle 220, added to the high order bits in the ZH register 152 of the previous cycle (220): $QH_0 + ZH_1$. Similarly, the fourth clock cycle 240 contains the product and accumulated sums from the previous cycles 230: $QH_1 + ZH_0$. Finally the last line in the timing diagram illustrates the output signals from registers ZH and ZL merged onto the single output bus (Z) 160. In the third clock cycle 230, the $ZH_0$ and $ZL_0$ register contents are generated. Likewise in the fourth clock 240 cycle, the $ZH_1$ and $ZL_1$ register contents are generated.

Figure 3:
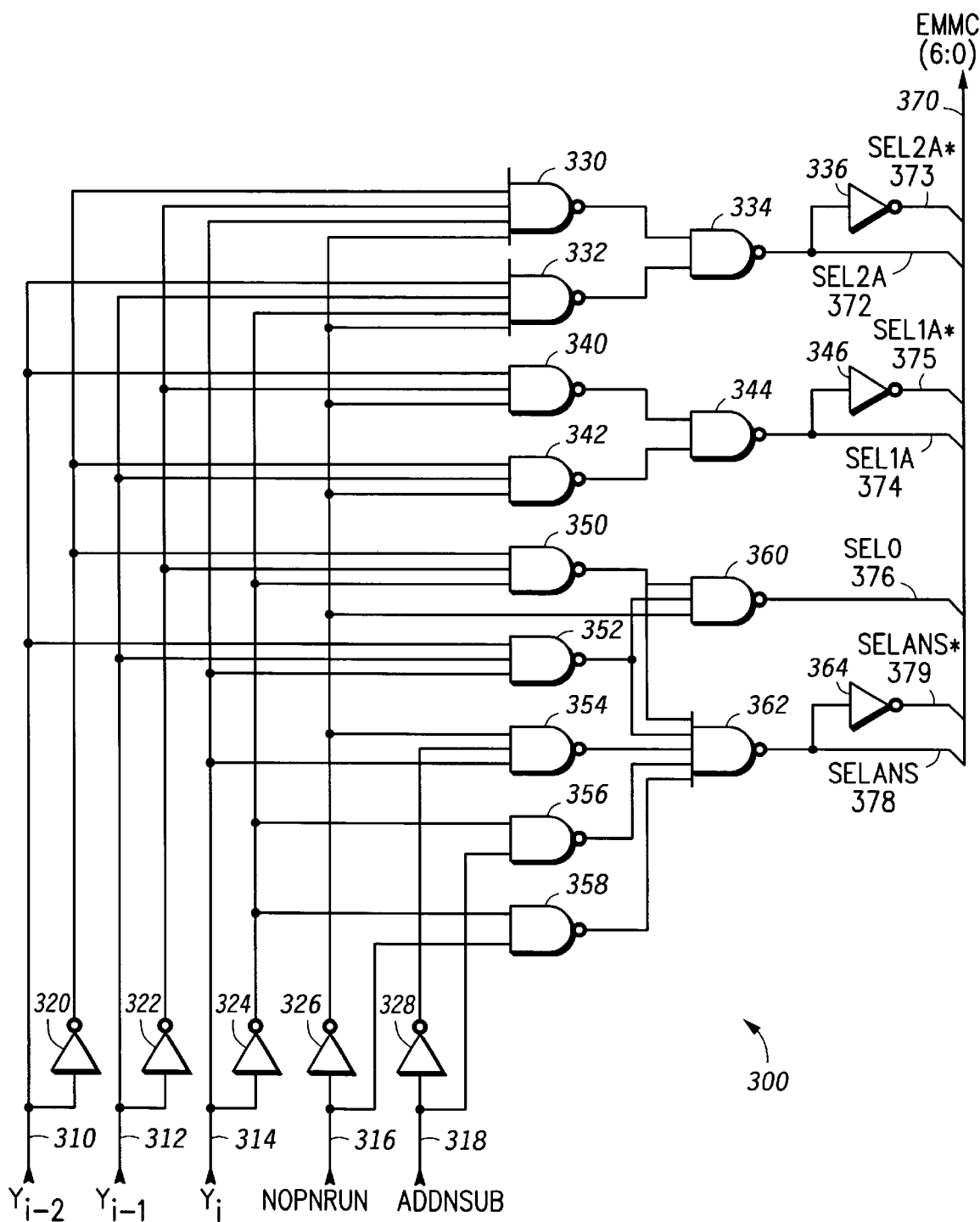
FIG. 3 is a logic diagram illustrating a radix-4 modified Booth's recoder circuit of FIG. 1.

FIG. 3 is a logic diagram illustrating a radix-4 modified Booth's recoder circuit 300. In the preferred embodiment, with an 18-bit second operand (Y) 114, the Booth's recoder 120 contains nine of these radix-4 modified Booth's recoder circuits 300, one for each pair of bits in the input operand. The modified Booth's recoder circuit 300 has five inputs: $Y_{i-2}$ 310, $Y_{i-1}$ 312, $Y_i$ 314, NOPNRUN 316, and ADDNSUB 318. For a given segment or recoder circuit 300, the $Y_i$ signal 314 is the high order bit of the pair of bits and the $Y_{i-1}$ 312 is the low order bit of the pair. The $Y_{i-2}$ 310 input signal is the high order signal of the next lower ordered recoder circuit 300. The lowest order recoder circuit 300 has a constant zero or ground as its $Y_{i-2}$ 310 input signal. In the case of an odd number of input bits to the recoder 120, both the $Y_{i-1}$ 312 and $Y_{i-2}$ 310 signals for the low order recoder circuit 300 have a constant zero or ground value. In all cases, it is possible to optimize the low order recoder circuit to remove circuitry made redundant by constant zero input values.

Each of the five input signals is inverted 320, 322, 324, 326, 328. A first NAND gate 330 has four input signals: the inverted 320 $Y_{i-2}$ signal, the inverted 322 $Y_{i-1}$ signal, the $Y_i$ 314 signal, and the inverted 326 NOPNRUN signal. A second NAND gate 332 has four inputs: the $Y_{i-2}$ signal 310, the $Y_{i-1}$ signal 312, the inverted 324 $Y_i$ signal 314, and the inverted 326 NOPNRUN signal. The outputs of the first NAND 330 and the second NAND 332 gates provide the two inputs to a third NAND gate 334. The output of the third NAND gate 334 provides a Select 2*A (SEL2A) signal 372. The SEL2A signal 372 is also inverted 336 as a SEL2A* signal 373. A fourth NAND gate 340 has three inputs: the $Y_{i-2}$ signal 310, the inverted 322 $Y_{i-1}$ signal, and the inverted 326 NOPNRUN signal. A fifth NAND gate 342 has three inputs: the inverted 320 $Y_{i-2}$ signal, the $Y_{i-1}$ signal 312, and the inverted 326 NOPNRUN signal. The outputs of the fourth NAND gate 340 and the fifth NAND gate 342 provide the two inputs for a sixth NAND gate 344. The output of the sixth NAND gate 344 provides a Select 1*A (SEL1A) signal 374. Additionally, the SEL1A signal 374 is inverted 346 to generate a SEL1A* signal 375.

A seventh NAND gate 350 has three inputs: the inverted 320 $Y_{i-2}$ signal, the inverted 322 $Y_i$ signal, and the inverted 324 $Y_i$ signal. An eighth NAND gate 352 has three inputs: the $Y_{i-2}$ signal 310, the $Y_{i-1}$ signal 312, and the $Y_i$ signal 314. A ninth NAND gate 354 has three inputs: the inverted 326 NOPNRUN signal, the inverted 328 ADDNSUB signal, and the $Y_i$ signal 314. A tenth NAND gate 356 has two inputs: the inverted 324 $Y_i$ signal, and the ADDNSUB signal 118. An eleventh NAND 358 has 2 inputs: the inverted 324 $Y_i$ signal, and the NOPNRUN signal 118. A twelfth NAND gate 360 has three inputs: the output of the seventh NAND gate 350, the output of the eighth NAND gate 352, and the inverted 326 NOPNRUN signal. A thirteenth NAND gate 362 has five inputs: the output from the seventh NAND gate 350, the output from the eighth NAND gate 352, the output from the ninth NAND gate 354, the output from the tenth NAND gate 356, and the output from the eleventh NAND gate 358. The output from the twelfth NAND gate 360 provides a Select Zero (SEL0) signal 376. The output from the thirteenth NAND gate 362 provides a Select Add Not Subtract (SELANS) signal 378. The SELANS signal 378 is inverted 364 to provide a SELANS* signal 379. The seven output signals for each recoder circuit 300 are combined 370 with each other and with the outputs in those from the other eight recoder circuits 300 as the modified Booth's recoder 120 inputs to the partial product multiplier array 130.

FIG. 4 is a table illustrating a radix-4 modified Booth's algorithm recoder for a multiply and accumulate (MAC) instruction. Three input columns are shown: $Y_{i-2}$ 310, $Y_{i-1}$ 312, and $Y_i$ 314. The eight possible binary encodings of the $Y_{i-2}$ 310, $Y_{i-1}$ 312, and $Y_i$ 314 bits are shown. A fourth column shows a corresponding operation. The operation controls generation of four output signals: SEL1A 374, SEL2A 372, SEL0 376, and SELANS 378. Note, that the inverse of these signals are also implicitly generated. When $Y_i$, $Y_{i-1}$, and $Y_{i-2}$ are all binary 0, the operation has a value of zero. The result is that the SEL1A signal and the SEL2A signal are both zero, while the SEL0 and the SELANS signal both have a value of 1. In the case of $Y_i$, $Y_{i-1}$, and $Y_{i-2}$ having a combined binary value of 001, the operation is a +X operation. This results in a SEL1A value of one (1), a SEL2A value of zero (0), a SEL0 value of zero (0), and a SELANS value of one (1). Identical operation and output signals are generated by the binary value of 010. In the case of binary 011 inputs, the operation is +2X. This results in a SEL1A signal of zero (0), a SEL2A signal of one (1), a SEL0 signal equal to zero (0), and a SELANS signal equal to one (1). In the case of binary input values equal to binary 100, a −2X operation is indicated. This generates an identical set of outputs to the +2X operation, with the exception that the SELANS signal is equal to zero (0). The binary 101 and 110 inputs indicate a −X operation. This generates output identical to the +X operation outputs with the exception that the SELANS signal is zero (0). Finally, the binary 111 input generates a +0 operation, which is identical to the +0 operation which generates identical outputs to the +0 operation for binary inputs equal to 000. The outputs in FIG. 4 are generated by the recoder circuit 300 whenever the NOPNRUN signal 116 and the ADDNSUB signal 118 are both zero (0).

FIG. 5 is a table illustrating a radix-four modified Booth's algorithm recoder circuit 300 for NOP instructions. It has identical format to the table shown in FIG. 4. The three input columns and the operation column are also identical. However, the four output signals are different. In all instances, regardless of the value of $Y_i$, $Y_{i-1}$, and $Y_{i-2}$, the SEL1A signal 374, and the SEL2A signal 372 are set to zero (0). The SEL0 376 signal is set to one (1), indicating that a constant zero (0) is generated. The SELANS signal 378 is only set when the binary inputs are equal to either all zero's or all ones, otherwise, the signal is always zero (0). This provides an easy and efficient way to shut-down the partial product multiplication array 130 whenever a MAC 100 NOP instruction is executed.

FIG. 6 is a radix-4 modified Booth's algorithm recoder circuit 300 for a multiply and subtract (MSUB) instruction. The first seven columns are identical to the first seven columns in FIG. 4. The last column: the SELANS signal 378 is inverted from that in FIG. 4: the SELANS signal 378 is zero (0) for binary values of 000, 001, 010, 011, and 111, and the SELANS signal 378 is equal to one (1) for binary values of 100, 101, and 110. This provides an easy and efficient implementation of a multiply and subtract (MSUB) instruction without the necessity of adding any appreciable amount of circuitry.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A data processing system having a multiply/accumulate unit that multiplies a first input operand having a plurality of first input operand bits by a second input operand to generate a product, wherein the multiply/accumulate unit comprises:
a recoder that receives the plurality of first input operand bits and instruction information and generates a plurality of recoder signals, wherein:
the recoder comprises a recoder circuit that receives a subset of the first input operand bits; and
a partial product array that receives the second input operand and the plurality of recoder signals and at least a portion of the partial product array and shuts down for at least one cycle in response to the instruction information indicating that a NOP instruction is executing.

2. A data processing system having a multiply/accumulate unit that multiplies a first input operand having a plurality of first input operand bits by a second input operand to generate a product, wherein the multiply/accumulate unit comprises:
a recoder that receives the plurality of first input operand bits and instruction information and generates a plurality of recoder signals, wherein:
the recoder comprises a recoder circuit that receives a subset of the first input operand bits; and
a partial product array that receives the second input operand and the plurality of recoder signals and at least a portion of the partial product array and mathematically negates a sign of the product in response to the instruction information indicating that a multiply-subtract instruction is executing.

3. A data processing system having a multiply/accumulate unit that multiplies a first input operand having a plurality of first input operand bits by a second input operand to generate a product, wherein the multiply/accumulate unit comprises:
a recoder that receives the plurality of first input operand bits and instruction information and generates a plurality of recoder signals, wherein:
the recoder comprises a recoder circuit that receives a subset of the first input operand bits; and
a partial product array that receives the second input operand and the plurality of recoder signals and at least a portion of the partial product array and shuts down for at least one cycle in response to the instruction information indicating that an accumulate-only instruction is executing.

4. A data processing system comprising:

an instruction decode unit that generates a plurality of instruction decode signals and is capable of decoding a multiply and add instruction and a multiply and subtract instruction; and a multiply/accumulate unit that multiplies a first input operand having a plurality of first input operand bits by a second input operand to generate a product,
wherein the multiply/accumulate unit comprises:
a recoder that receives the plurality of first input operand bits and a subset of the plurality of instruction decode signals and generates a plurality of recoder signals, wherein:
the recoder comprises a recoder circuit that receives a subset of the first input operand bits,
one of the plurality of recoder signals is a subtract signal that has a first subtract signal state and a second signal state,
generation of the subtract signal is dependent upon the subset of the subset of the plurality of instruction decode signals identifying whether the multiply and add instruction or the multiply and subtract instruction has been decoded; and
a partial product array that receives the second input operand and the plurality of recoder signals and utilizes the subtract signal to selectively perform the multiplication and add instruction and the multiplication and subtract instruction.

5. A data processing system having a multiply/accumulate unit that multiplies a first input operand having a plurality of first input operand bits by a second input operand to generate a product,
wherein the multiply/accumulate unit comprises:
a recoder that receives the plurality of first input operand bits and a set of data controller signals and generates a plurality of recoder signals, wherein:
the recoder comprises a recoder circuit that receives a subset of the first input operand bits;
a partial product array that receives the second input operand and the plurality of recoder signals and at least a portion of the partial product array shuts down for at least one cycle in response to the plurality of recoder signals;

a data controller which receives a set of signals from instruction decode and in response to the set of signals from instruction decode generates the set of data controller signals received by the recoder, wherein:
the set of data controller signals includes a subtract signal having a first subtract signal state and a second subtract signal state and a NOP signal having a first NOP signal state and a second NOP signal state,
the recoder circuit generates a first set of recoder signals when the NOP signal is in the first NOP signal state,
the recoder circuit generates a second set of recoder signals when the NOP signal is in the second NOP signal state and the subtract signal is in the first subtract signal state, and
the recoder circuit generates a third set of recoder signals when the NOP signal is in the second NOP signal state and the subtract signal is in the second subtract signal state;
a low order intermediate product register that registers and accumulates a low order intermediate product result from the partial product array, wherein:
an output from the low order intermediate product register selectively provides a low order accumulated input operand to the partial product array;
a high order intermediate product register that registers a high order product result from the partial product array;
a first carry look-ahead adder that receives the low order intermediate product result from the partial product array as a first input operand and provides a sum for registration by the low order intermediate product register;
a second carry look-ahead adder that receives a first input operand from the high order intermediate product register and a carry-in from the low order intermediate product register;
a high order final result register that registers an output from the second carry look-ahead adder; and
a low order final result register that registers a second output from the low order intermediate product register, wherein:
the high order final result register selectively provides a third input operand to the second carry look-ahead adder.

* * * * *